(12) United States Patent
Zhang et al.

(10) Patent No.: US 12,395,929 B2
(45) Date of Patent: Aug. 19, 2025

(54) RECEPTION SCHEME

(71) Applicant: NOKIA TECHNOLOGIES OY, Espoo (FI)

(72) Inventors: Yanji Zhang, Beijing (CN); Mikko Saily, Laukkoski (FI); Yuantao Zhang, Beijing (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/471,875

(22) PCT Filed: Dec. 22, 2016

(86) PCT No.: PCT/CN2016/111548
§ 371 (c)(1),
(2) Date: Jun. 20, 2019

(87) PCT Pub. No.: WO2018/112846
PCT Pub. Date: Jun. 28, 2018

(65) Prior Publication Data
US 2020/0092805 A1 Mar. 19, 2020

(51) Int. Cl.
*H04W 52/02* (2009.01)
(52) U.S. Cl.
CPC ... *H04W 52/0216* (2013.01); *H04W 52/0229* (2013.01)

(58) Field of Classification Search
CPC ............. H04W 52/02; H04W 52/0209; H04W 52/0212; H04W 52/0216; H04W 52/0225; H04W 52/0229; H04W 74/00; H04W 74/08; H04W 76/28
See application file for complete search history.

(56) References Cited

U.S. PATENT DOCUMENTS

| | | | | |
|---|---|---|---|---|
| 2009/0180414 A1* | 7/2009 | Maeda | ................. | H04B 7/2643 370/311 |
| 2010/0128646 A1* | 5/2010 | Gao | ...................... | H04W 68/00 370/312 |
| 2011/0211466 A1* | 9/2011 | Kazmi | ............... | H04W 52/0261 370/252 |

(Continued)

FOREIGN PATENT DOCUMENTS

| | | |
|---|---|---|
| CN | 1941995 A | 4/2007 |
| CN | 102088775 A | 6/2011 |

(Continued)

OTHER PUBLICATIONS

International Search Report and Written Opinion dated Aug. 30, 2017 corresponding to International Patent Application No. PCT/CN2016/111548.

(Continued)

*Primary Examiner* — Kevin C. Harper
(74) *Attorney, Agent, or Firm* — SQUIRE PATTON BOGGS (US) LLP

(57) ABSTRACT

A method comprising: configuring a user equipment in a low activity state to operate according to a grant-free uplink transmission scheme; and in response to detecting at least one condition, scheduling a discontinuous reception state at (Continued)

the user equipment, during which the user equipment is configured to monitor for one or more messages intended for the user equipment.

12 Claims, 4 Drawing Sheets

(56) References Cited

U.S. PATENT DOCUMENTS

| | | | |
|---|---|---|---|
| 2013/0128788 A1* | 5/2013 | Guey | H04W 52/0216 370/311 |
| 2013/0182626 A1 | 7/2013 | Kuo | |
| 2013/0308465 A1* | 11/2013 | Xu | H04L 47/27 370/241 |
| 2014/0133430 A1* | 5/2014 | Yang | H04W 74/0833 370/329 |
| 2014/0307606 A1* | 10/2014 | Cai | H04W 76/28 370/311 |
| 2015/0215868 A1* | 7/2015 | Xu | H04W 76/28 370/311 |
| 2016/0262118 A1* | 9/2016 | Kim | H04W 52/365 |
| 2016/0353453 A1 | 12/2016 | Au et al. | |
| 2017/0288817 A1* | 10/2017 | Cao | H04L 1/1812 |
| 2017/0318584 A1* | 11/2017 | Zeng | H04W 72/14 |
| 2018/0097679 A1* | 4/2018 | Zhang | H04L 27/2607 |
| 2019/0174570 A1 | 6/2019 | Fujishiro et al. | |

FOREIGN PATENT DOCUMENTS

| | | |
|---|---|---|
| CN | 103733717 A | 4/2014 |
| CN | 105580445 A | 5/2016 |
| EP | 2 661 138 A1 | 11/2013 |
| WO | 2015/113199 A1 | 8/2015 |
| WO | 2016/179783 A1 | 11/2016 |
| WO | WO 2016182533 A1 | 11/2016 |

OTHER PUBLICATIONS

Sep. 4, 2020 Extended Search Report issued in European Patent Application No. 16924651.9.
Huawei Hisilicon: "UL data transmission in RRN_Inactive", 3GPP Draft; R2-168544 UL Data Transmission in RRC_Inactive, 3rd Generation Partnership Project (3GPP), Mobile Competence Centre; 650, Route Des Lucioles; F-06921 Sophia-Antipolis Cedex; France, vol. RAN WG2, No. Reno, Nevada, USA; Nov. 14, 2016-Nov. 18, 2016; Nov. 13, 2016.
Huawei et al., "Revision of WI: Signalling reduction to enable light connection for LTE," 3GPP, RP-160937, 3GPP TSG RAN Meeting #72, Busan, South Korea, Jun. 13-17, 2016
Communication pursuant to Article 94(3) EPC dated Aug. 27, 2021 corresponding to European Patent Application No. 16924651.9.
Huawei et al., "Discussion on grant-free transmission," 3GPP Draft; R1-166095, 3GPP TSG RAN WG1 Meeting #86, Gothenburg, Sweden, Aug. 21, 2016, XP051125210.
First Office Action dated Sep. 19, 2022 corresponding to Chinese Patent Application No. 201680092054.2, with Search Report.
CMCC, UE states in NR, R2-167070, 3GPP TSG-RAN WG2 Meeting #95bis, Kaohsiung, Oct. 10-14, 2016.
Second Office Action issued in corresponding Chinese Patent Application No. 201680092054.2 dated Apr. 11, 2023, with English language summary thereof.
Communication pursuant to Article 94(3) EPC issued in corresponding European Patent Application No. 16 924 651.9 dated Apr. 19, 2023.
Chinese Office Action corresponding to CN Application No. 201680092054.2, dated Jul. 26, 2023.
U.S. Office Action corresponding to co-pending U.S. Appl. No. 18/609,922, dated Jul. 16, 2025.

* cited by examiner

RECEPTION SCHEME

FIELD

This disclosure relates to communications, and particularly to a reception scheme for a wireless communication system. More particularly still this disclosure relates to a discontinuous reception scheme for a user equipment operating in a 5G network.

BACKGROUND

A communication system can be seen as a facility that enables communication between two or more devices such as user terminals, machine-like terminals, base stations and/or other nodes by providing communication channels for carrying information between the communicating devices. A communication system can be provided for example by means of a communication network and one or more compatible communication devices. The communication may comprise, for example, communication of data for carrying data for voice, electronic mail (email), text message, multimedia and/or content data communications and so on. Non-limiting examples of services provided include two-way or multi-way calls, data communication or multimedia services and access to a data network system, such as the Internet.

In a wireless system at least a part of communications occurs over wireless interfaces. Examples of wireless systems include public land mobile networks (PLMN), satellite based communication systems and different wireless local networks, for example wireless local area networks (WLAN). A local area wireless networking technology allowing devices to connect to a data network is known by the tradename WiFi (or Wi-Fi). WiFi is often used synonymously with WLAN. The wireless systems can be divided into cells, and are therefore often referred to as cellular systems. A base station provides at least one cell.

A user can access a communication system by means of an appropriate communication device or terminal capable of communicating with a base station. Hence nodes like base stations are often referred to as access points. A communication device of a user is often referred to as user equipment (UE). A communication device is provided with an appropriate signal receiving and transmitting apparatus for enabling communications, for example enabling communications with the base station and/or communications directly with other user devices. The communication device can communicate on appropriate channels, e.g. listen to a channel on which a station, for example a base station of a cell, transmits.

A communication system and associated devices typically operate in accordance with a given standard or specification which sets out what the various entities associated with the system are permitted to do and how that should be achieved. Communication protocols and/or parameters which shall be used for the connection are also typically defined. Non-limiting examples of standardised radio access technologies include GSM (Global System for Mobile), EDGE (Enhanced Data for GSM Evolution) Radio Access Networks (GERAN), Universal Terrestrial Radio Access Networks (UTRAN) and evolved UTRAN (E-UTRAN). An example communication system architecture is the long-term evolution (LTE) of the Universal Mobile Telecommunications System (UMTS) radio-access technology. The LTE is standardized by the 3rd Generation Partnership Project (3GPP). The LTE employs the Evolved Universal Terrestrial Radio Access Network (E-UTRAN) access and a further development thereof which is sometimes referred to as LTE Advanced (LTE-A). Since introduction of fourth generation (4G) services increasing interest has been paid to the next, or fifth generation (5G) standard. 5G is sometimes also referred to as New Radio Access Technology (N-RAT) or simply New Radio (NR). N-RAT aims to enable a diverse and wide range of services which need to deliver high throughput, connect numerous devices or terminals and provide immediate feedback on demand. The terms 5G, NR, 5G NR and N-RAT are used interchangeably herein.

STATEMENT OF INVENTION

According to a first aspect there is provided a method comprising: configuring a user equipment in a low activity state to operate according to a grant-free uplink transmission scheme; and in response to detecting at least one condition, scheduling a discontinuous reception state at the user equipment, during which the user equipment is configured to monitor for one or more messages intended for the user equipment.

According to some embodiments, the at least one condition comprises a paging occasion in a paging cycle.

According to some embodiments, the at least one condition comprises a response window, the response window comprising a time frame during which a downlink message is expected in response to an uplink message sent by the user equipment according to the grant-free uplink transmission scheme.

According to some embodiments, the condition comprises a time period during which a timer is running.

According to some embodiments, the timer comprises a discontinuous reception inactivity timer or a discontinuous reception retransmission timer.

According to some embodiments, the user equipment is configured to restart the timer in response to determining that there is a message intended for the user equipment.

According to some embodiments, the user equipment is configured to enter a discontinuous reception sleep state following expiration of the timer.

According to some embodiments, the monitoring for one or more messages comprises monitoring for one or more of: a response to an uplink message sent by the user equipment according to the grant-free uplink transmission scheme; a mobile terminating data notification.

According to some embodiments, the monitoring for one or more messages comprises monitoring a physical downlink control channel.

According to some embodiments, the monitoring the physical downlink control channel comprises monitoring for a random access radio network temporary identifier (RA-RNTI) if the one or more messages is group based, and/or monitoring for a cell radio network temporary (C-RNTI) identifier if the one or more messages is user equipment specific, and/or monitoring for a paging radio network temporary identifier (P-RNTI) in order to check for the presence of a paging message.

According to some embodiments, the low activity state comprises an inactive or idle state.

According to some embodiments, the user equipment is operating in a fifth generation or new radio network.

According to some embodiments, the user equipment is caused to enter the low activity state in response to an instruction from a radio access network node.

According to some embodiments the method is carried out in the user equipment.

According to some embodiments the method is carried out in a network node.

According to some embodiments, the method is distributed between the user equipment and the network node.

In a second aspect there is provided a computer program comprising program code means adapted to perform the steps of the first aspect when the program is run on a data processing apparatus.

According to a third aspect there is provided an apparatus comprising at least one processor, and at least one memory including computer program code, wherein the at least one memory and the computer program code are configured, with the at least one processor, to: configure the apparatus in a low activity state to operate according to a grant-free uplink transmission scheme; and in response to detecting at least one condition, schedule a discontinuous reception state at the apparatus, during which the apparatus is configured to monitor for one or more messages intended for the apparatus.

According to some embodiments, the at least one condition comprises a paging occasion in a paging cycle.

According to some embodiments, the at least one condition comprises a response window, the response window comprising a time frame during which a downlink message is expected in response to an uplink message sent by the apparatus according to the grant-free uplink transmission scheme.

According to some embodiments, the condition comprises a time period during which a timer is running.

According to some embodiments, the timer comprises a discontinuous reception inactivity timer or a discontinuous reception retransmission timer.

According to some embodiments, the apparatus is configured to restart the timer in response to determining that there is a message intended for the apparatus.

According to some embodiments, the apparatus is configured to enter a discontinuous reception sleep state following expiration of the timer.

According to some embodiments, the monitoring for one or more messages comprises monitoring by the apparatus for one or more of: a response to an uplink message sent by the apparatus according to the grant-free uplink transmission scheme; a mobile terminating data notification.

According to some embodiments, the monitoring for one or more messages comprises monitoring a physical downlink control channel by the apparatus.

According to some embodiments, the monitoring the physical downlink control channel comprises monitoring for a random access radio network temporary identifier (RA-RNTI) if the one or more messages is group based, and/or monitoring for a cell radio network temporary (C-RNTI) identifier if the one or more messages is user equipment specific, and/or monitoring for a paging radio network temporary identifier (P-RNTI) in order to check for the presence of a paging message.

According to some embodiments, the low activity state comprises an inactive or idle state.

According to some embodiments, the apparatus is configured to operate in a fifth generation or new radio network.

According to some embodiments, the apparatus is configured to be caused to enter the low activity state in response to an instruction from a radio access network node.

According to a fourth aspect there is provided an apparatus comprising means for configuring the apparatus in a low activity state to operate according to a grant-free uplink transmission scheme; and in response to detecting at least one condition, means for scheduling a discontinuous reception state at the apparatus, during which the apparatus is configured to monitor for one or more messages intended for the apparatus.

According to some embodiments, the at least one condition comprises a paging occasion in a paging cycle.

According to some embodiments, the at least one condition comprises a response window, the response window comprising a time frame during which a downlink message is expected in response to an uplink message sent by the apparatus according to the grant-free uplink transmission scheme.

According to some embodiments, the condition comprises a time period during which a timer is running.

According to some embodiments, the timer comprises a discontinuous reception inactivity timer or a discontinuous reception retransmission timer.

According to some embodiments, the apparatus comprises means for restarting the timer in response to determining that there is a message intended for the apparatus.

According to some embodiments, the apparatus comprises means for entering a discontinuous reception sleep state following expiration of the timer.

According to some embodiments, the monitoring for one or more messages comprises monitoring by the apparatus, using monitoring means, for one or more of: a response to an uplink message sent by the apparatus according to the grant-free uplink transmission scheme; a mobile terminating data notification.

According to some embodiments, the monitoring for one or more messages comprises monitoring a physical downlink control channel by the apparatus.

According to some embodiments, the monitoring the physical downlink control channel comprises monitoring for a random access radio network temporary identifier (RA-RNTI) if the one or more messages is group based, and/or monitoring for a cell radio network temporary (C-RNTI) identifier if the one or more messages is user equipment specific, and/or monitoring for a paging radio network temporary identifier (P-RNTI) in order to check for the presence of a paging message.

According to some embodiments, the low activity state comprises an inactive or idle state.

According to some embodiments, the apparatus comprises means for operating in a fifth generation or new radio network.

According to some embodiments, the apparatus comprises means to be caused to enter the low activity state in response to an instruction from a radio access network node.

According to a fifth aspect there is provided a system comprising: at least one network node; and an apparatus comprising at least one processor, and at least one memory including computer program code, wherein the at least one memory and the computer program code are configured, with the at least one processor, to: configure the apparatus in a low activity state to operate according to a grant-free uplink transmission scheme; and in response to detecting at least one condition, schedule a discontinuous reception state at the apparatus, during which the apparatus is configured to monitor for one or more messages intended for the apparatus from the at least one network node.

BRIEF DESCRIPTION OF FIGURES

The invention will now be described in further detail, by way of example only, with reference to the following examples and accompanying drawings, in which.

DETAILED DESCRIPTION

In the following certain exemplifying embodiments are explained with reference to a wireless communication system serving communication devices adapted for wireless communication. Certain general principles of wireless systems are first briefly explained with reference to FIGS. 1 to 3.

A communication device 20, 21 can be used for accessing various services and/or applications provided via cells 4, 5, 6 of a cellular system. In a wireless communication system the access can be provided via wireless access interfaces between wireless communication devices and one or more base stations of a radio access network 1. Each mobile device and base station may have one or more radio channels open at the same time and may receive signals from more than one source.

Figure 1:
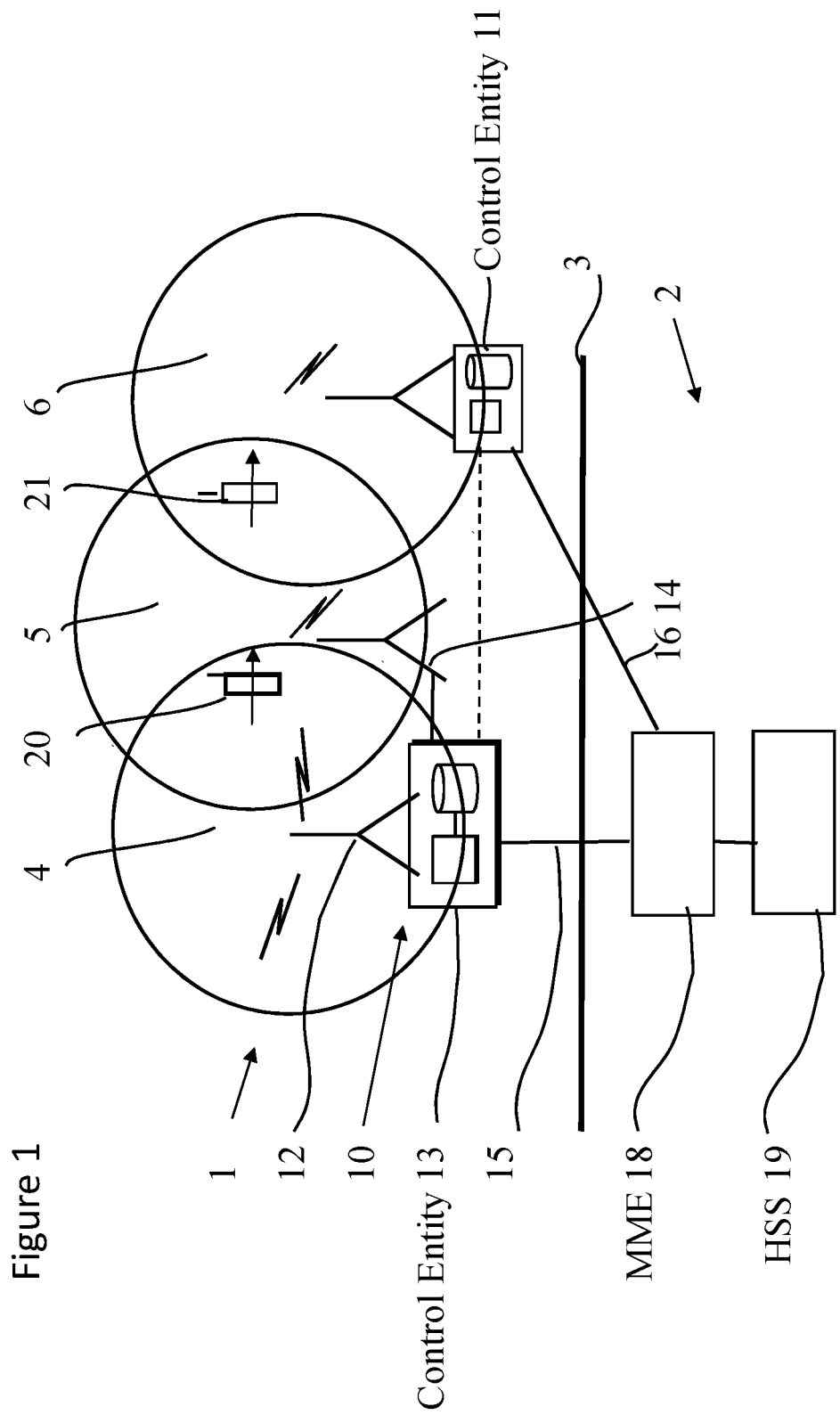
FIG. 1 shows a schematic example of a wireless communication system.

The mobile communication devices can move from a cell to another, as illustrated by arrows on top of the devices 20 and 21 in FIG. 1. The process of handling the moving from a cell to the other is called handover. Handovers can be provided, for example, in wireless environment comprising one or more fifth generation (5G) radio access networks (RAN). A part of handover procedure is known as cell reselection.

Figure 4:
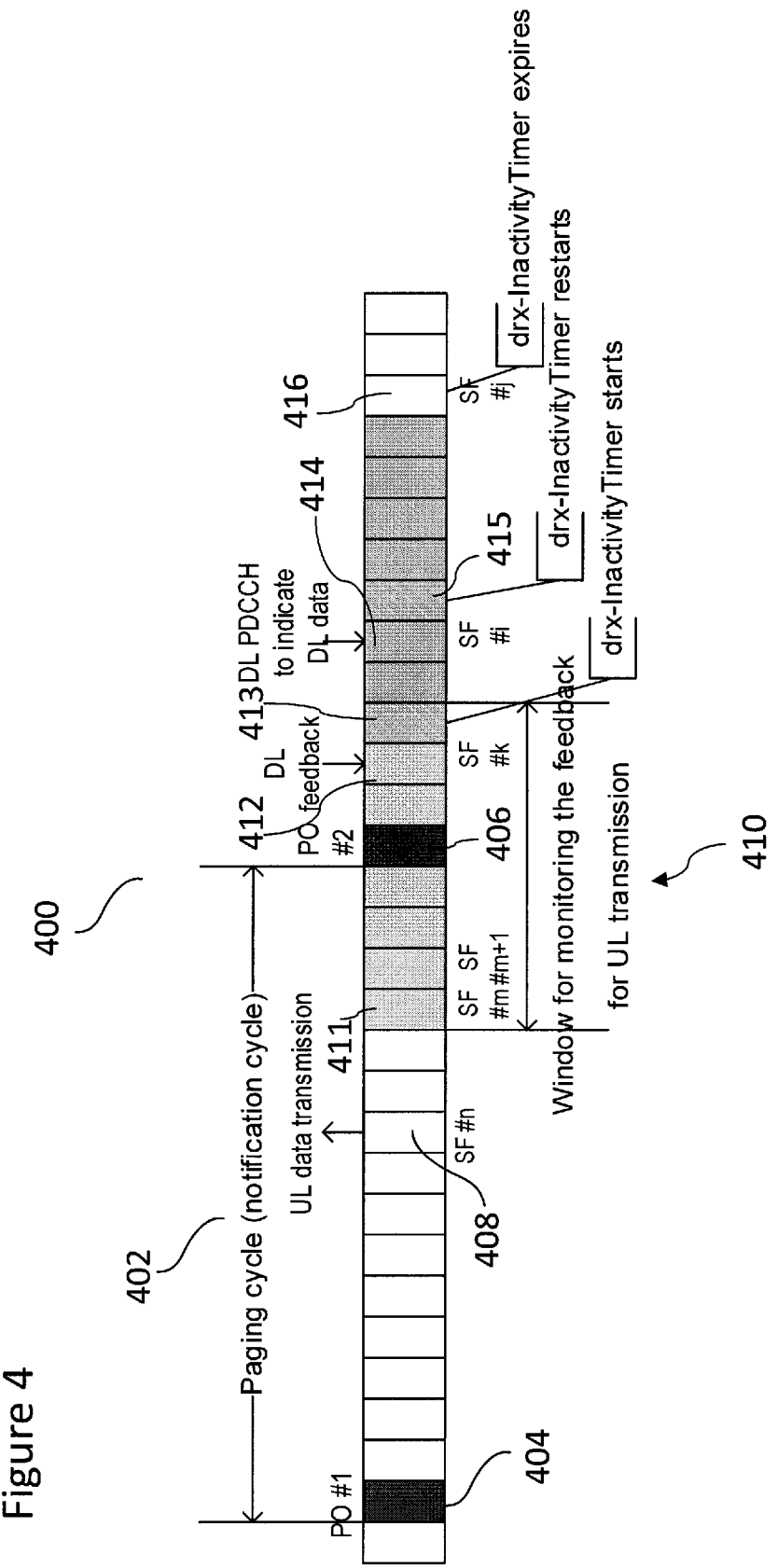
FIG. 4 schematically shows subframe scheduling according to an embodiment.

A base station site can provide at least one cell. In the highly schematic FIG. 1 example, a base station site 10 comprising a controller 13 and base station apparatus 12 and 14 is shown to provide a plurality of cells 4 and 5, respectively. In the example of FIG. 4 cell 4 is provided by antenna apparatus of station 12 in one location, and at least one further cell is provided by a remote radio head 14. It is noted that this exemplifying arrangement is only shown for illustrative purposes, and that e.g. antenna apparatus 12 can provide more than one cell. The relevance in view of certain examples described below is that the controller 13 of the base station site 10 can control access and devices accessing the radio access network 1 in a number of cells.

In addition to the base station site 12, at least one other cell can also be provided by means of another base station or stations. This possibility is denoted by base station 11 in FIG. 1. Signalling between base stations, and controllers thereof, can be provided via an appropriate interface, for example an X2 interface or an evolution of X2 interface which may be referred to as X2* interface. The X2* interface may be used in 5G, and may comprise enhancements over the X2 interface. This is denoted by the dashed line between the control entities 13 and 11.

A wireless system is typically divided between a radio access system 1, typically called radio access network (RAN) and a core network (CN) 2. The division is denoted by line 3. The core network can comprise elements such as mobile management entity (MME) 18, home subscriber server (HSS) 19 and so forth. Connection between base station sites of the radio access network (RAN) and core network (CN) element can be provided via appropriate interfaces 15, 16. The connection between the RAN and the CN can be, for example, via a S1 interface or an evolution of the S1 interface which may be referred to as S1* interface. The S1* interface may be used in 5G, and may comprise enhancements over the S1 interface.

A communication device can access a communication system based on various access techniques, for example those based on the third Generation Partnership Project (3GPP) specifications. A non-limiting example of mobile architectures is known as the Evolved Universal Terrestrial Radio Access Network (E-UTRAN). The architecture may of course alternatively comprise a future equivalent to E-UTRAN, for example the architecture of the "Next Gen" or 5G network. A non-limiting example of a base station of a cellular system is what is termed as a NodeB or E-UTRAN NodeB (eNB/ENodeB) in the vocabulary of the 3GPP specifications. The eNBs may provide E-UTRAN features such as user plane Radio Link Control/Medium Access Control/Physical Layer Protocol (RLC/MAC/PHY) and control plane Radio Resource Control (RRC) protocol terminations towards mobile communication devices. At least some of the stations may be arranged to operate on the unlicensed radio spectrum. In the parlance of 5G these base stations may be referred to as gNBs or next generation Node Bs.

Figure 2:
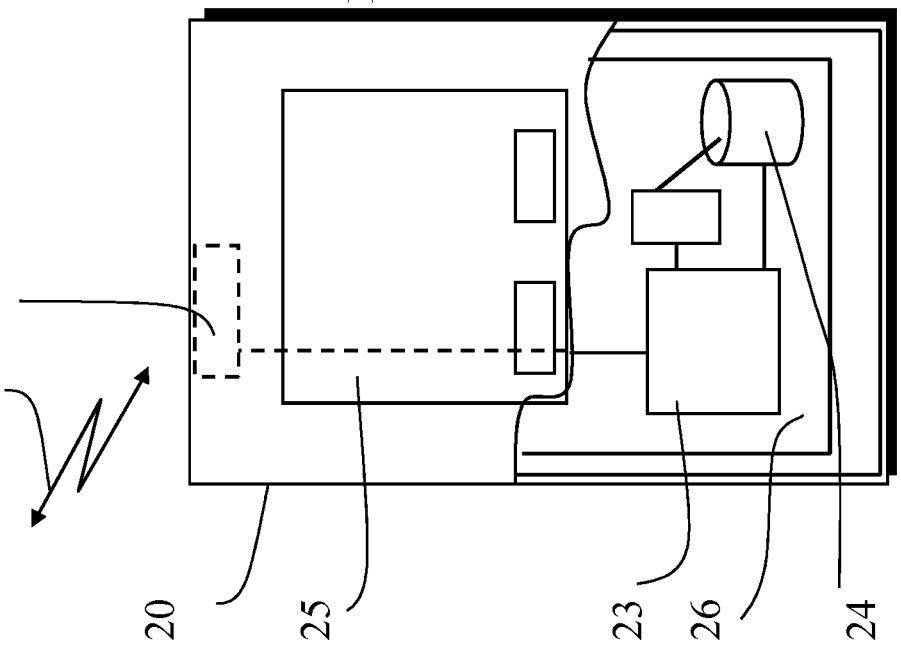
FIG. 2 shows an example of a communication device.

FIG. 2 shows a schematic, partially sectioned view of a communication device 20 that a user can use for communications. Such a communication device is often referred to as user equipment (UE) or terminal. An appropriate communication device may be provided by any device capable of sending and receiving radio signals. Non-limiting examples include a mobile station (MS) such as a mobile phone or what is known as a 'smart phone', a portable computer provided with a wireless interface card or other wireless interface facility, personal data assistant (PDA) provided with wireless communication capabilities, or any combinations of these or the like. A mobile communication device may provide, for example, communication of data for carrying communications such as voice, electronic mail (email), text message, multimedia, positioning data, other data, and so on. Users may thus be offered and provided numerous services via their communication devices. Non-limiting examples of these services include two-way or multi-way calls, data communication or multimedia services or simply an access to a data communications network system, such as the Internet.

A mobile device is typically provided with at least one data processing entity 23, at least one memory 24 and other possible components 29 for use in software and hardware aided execution of tasks it is designed to perform, including control of access to and communications with base stations and/or other user terminals. The tasks can include operation related to mobility management such as handling handovers and cell reselections. Further, the tasks can also relate to security aspects of the communications. The data processing, storage and other relevant control apparatus can be provided on an appropriate circuit board and/or in chipsets. This apparatus is denoted by reference 26.

A user may control the operation of the device 20 by means of a suitable user interface such as key pad, voice commands, touch sensitive screen or pad, combinations thereof or the like. A display 25, a speaker and a microphone are also typically provided. Furthermore, a mobile communication device may comprise appropriate connectors (either wired or wireless) to other devices and/or for connecting external accessories, for example hands-free equipment, thereto.

The device 20 may receive and transmit signals 28 via appropriate apparatus for receiving and transmitting signals.

In FIG. 2 transceiver apparatus is designated schematically by block 27. The transceiver may be provided for example by means of a radio part and associated antenna arrangement. The antenna arrangement may be arranged internally or externally to the mobile device. A wireless communication device can be provided with a Multiple Input/Multiple Output (MIMO) antenna system.

Figure 3:
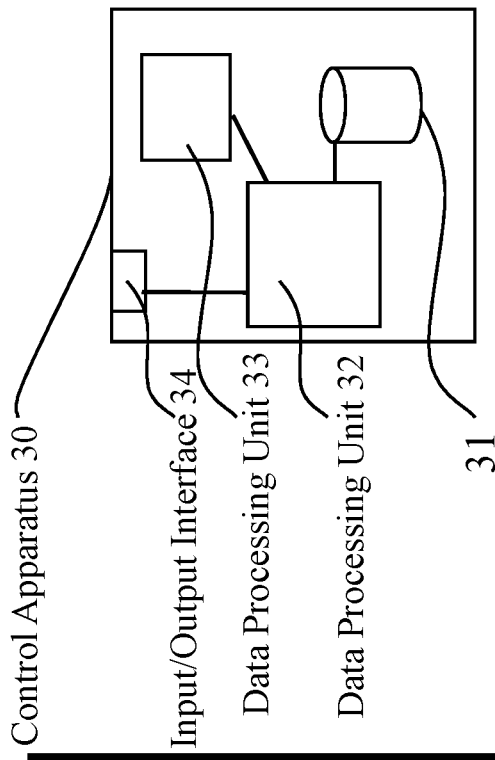
FIG. 3 shows an example of control apparatus.

FIG. 3 shows an example of a control apparatus 30 for a station, for example to be coupled to and/or for controlling one of the stations 11, 12 and 14 of FIG. 1. The control apparatus 30 can be arranged to provide control on configurations used by the communications devices accessing the station, information processing and/or communication operations. A control apparatus can be configured to provide control functions in association with generation, communications, and interpretation of control information. The control apparatus 30 comprises at least one memory 31, at least one data processing unit 32, 33 and an input/output interface 34. Via the interface the control apparatus can be coupled to the relevant node. The control apparatus 30 can be configured to execute an appropriate software code to provide the control functions.

Work for LTE release 14 and 5G New Radio (NR) has already begun. One of the topics that is under discussion is the introduction of a radio access network (RAN) controlled "inactive state". This may be considered a low power state of a UE. Within this RAN controlled state the core network (CN) and RAN connections may be maintained. A UE and at least one gNB (master base station in N-RAT terminology) should keep the access system (AS) context information. A UE location can be known at the RAN based area level where that area may be a single cell or more than one cell. The 3GPP light connection work item [WI: Signalling reduction to enable light connection for LTE, REL-14, 3GPP WID: RP-160937] is considered as baseline for NR inactive state, and it has also been agreed in RAN2 #96 that a UE in light connection will follow legacy paging occasion calculations, and listen to the paging messages for potential mobile terminating (MT) data.

In the known LTE idle state (power saving mode), the UE gets discontinuous reception (DRX) cycle related parameters from system information broadcast SIB2 message as part of the system information broadcast. The UE periodically wakes up to monitor the physical downlink control channel (PDCCH) in order to check for the presence of a paging message encrypted by paging radio network temporary identifier (P-RNTI). If the PDCCH indicates that a paging message is transmitted in the subframe, then the UE demodulates the physical channel (PCH) to see if the paging message is directed to it. Paging messages are typically sent by a mobility management entity (MME) to all eNBs in a Tracking Area, and those eNBs in a Tracking Area transmit the same paging message. A similar DRX has been considered for 5G/N-RAT.

The present inventors have identified that when a UE is in an inactive state (or low activity state), it should remain reachable by the RAN initiated notification procedure. On the other hand, a UE should be able to perform grant-free transmission when UL data arrives, and receive DL data in response to the transmitted UL data. It has been further identified by the present inventors that neither existing idle mode DRX procedure nor connected state DRX operation is sufficient in order to enable UL/DL data transmission in inactive state.

Some embodiments will now be described which allow a 5G UE to remain reachable whilst in a low activity or idle state, and which allow the UE to perform UL transmissions from a grant-free resource. In embodiments this may be achieved without requiring a state transition of the UE. In addition, the UE also remains reachable for mobile terminating (MT) data either by DL notification or direct MT data transmission. To some extent the embodiments may be considered to provide a hybrid DRX procedure. More particularly, the embodiments provide a DRX operation which supports potential UL/DL data transmission in an inactive UE state. In embodiments the hybrid DRX is able to work in a RAN notification area consisting of a single cell or more than one cell in a notification area list, since in embodiments the DRX is not tied to the cell configuration.

Thus in embodiments a UE is configured for operation in a low activity state. The UE may be moved to the low activity state following a pre-defined period of inactivity, and/or in response to an instruction from the RAN (e.g. gNB). In the low activity state the UE may be configured, for at least some of the time, to operate according to a grant-free uplink transmission scheme. This enables the user equipment to perform uplink transmission(s) without specific scheduling from the network. When a certain condition is met then the user equipment enters a discontinuous reception (DRX) active state in which the UE monitors for one or more messages intended for the UE. In some embodiments the UE monitors a physical downlink control channel (PDCCH) when monitoring for messages. In some embodiments the UE monitors a downlink control indicator (DCI) when monitoring for messages. The monitoring for messages may comprise monitoring for an identifier associated with the user equipment. The identifier may be a temporary identifier. For example the identifier may be a cell radio network temporary identifier (C-RNTI) or a random access radio network temporary identifier (RA-RNTI) or a paging access radio network temporary identifier (P-RNTI). The RNTI that is searched for may be dependent upon circumstances leading to the UE entering the DRX active state, or one or more events that have occurred while the UE is in the DRX active state.

Thus it will be understood that the user equipment may apply DRX operation when preforming grant-free uplink transmission.

As will be explained in more detail below, the parameter(s) or condition(s) which lead to the user equipment entering the DRX active state may include:

During a paging or notification cycle, each time a paging occasion or notification occasion occurs While a DRX inactivity timer is running While a DRX retranmission timer is running. This may itself depend upon whether HARQ is supported for the UL grant free transmission During a time window defined for monitoring feedback from a UL grant-free transmission. In other words, this may be considered a time frame during which a downlink message is expected in response to an uplink message sent by the user equipment according to the grant-free uplink transmission scheme.

The DRX inactivity timer defines how long (or for how much longer) the UE is to remain in the DRX active state. If the DRX inactivity timer expires then the UE exits the DRX active state. The inactivity timer is configured to have a pre-defined duration. In some embodiments the duration is network defined. In some embodiments the duration may be varied by the network. If an event occurs whilst the inactivity timer is running, such as receipt of DL data or notification of impending DL data, then the inactivity timer may be restarted. In other words in some embodiments the UE starts or restarts the DRX inactivity timer when it receives an acknowledgement for a UL data transmission or the PDCCH indicates a new data transmission. In some embodiments the timer can be understood as a time frame or time offset between a first instance and a second instance of DRX operation. The first instance may for example indicate a start of a timer or a response window, and the second instance may indicate the stop of a timer or a response window.

According to embodiments there are at least two DRX modes of operation: DRX operation for UL grant free transmission, and DRX operation for mobile terminating (MT) data notification. Although these regimes may in some embodiments run in parallel, they are discussed in-turn below.

In DRX operation for UL grant free transmission the UE listens for potential feedback for the UL data sent from the grant free resource. This time period may be considered a "window". Depending on how the feedback (e.g. acknowledgement or ACK) is sent from the network to the UE (e.g. the feedback could be UE specific or group based), the UE remains in "DRX active" state until the PDCCH indicates an acknowledgement addressed to C-RNTI (UE specific feedback), or RA-RNTI (group based feedback). It is noted that the UE identifier could of course also be a new/other identifier specified for RRC inactive state in NR, for example consisting of RAN tracking area or notification area code and C-RNTI.

Once the UE receives the acknowledgement, the UE starts (or restarts) the drx-InactivityTimer. If an identifier (e.g. temp C-RNTI) is contained in the feedback message, the UE may use it for subsequent PDCCH monitoring. Otherwise it may use the stored C-RNTI allocated when in connected state.

When the drx-InactivityTimer is running, the UE monitors the PDCCH addressed by the C-RNTI or temp C-RNTI.

During the window for the feedback for UL grant free transmission, if a subframe falls in "active" time (i.e. while the UE is in DRX active state), then the UE monitors PDCCH for both C-RNTI (or temp C-RNTI) and RA-RNTI. The PDCCH addressed by RA-RNTI may indicate the feedback for UL grant free transmission if the feedback is group based. The PDCCH addressed by C-RNTI may indicate the feedback for UL grant free transmission if the feedback is UE specific. In embodiments the PDCCH addressed by C-RNTI or temp C-RNTI may indicate the DL transmission in response to UL data previously sent.

In DRX operation for Mobile Terminating (MT) data notification there is provided at least two potential schemes for notifying the MT data to the UE:
 DL notification to trigger either DL transmission or state transition
 Direct data reception without DL notification. In such embodiments there is no paging, but normal PDCCH is used for scheduling DL data
Depending on how the MT data notification is supported or configured, at each paging opportunity (PO) in a paging cycle, if the PO falls into a timeframe or window for expected DL feedback for UL contention based (CB) transmission, and if UE has sent UL data, the UE may check the feedback by:
 monitoring PDCCH addressed by C-RNTI if the feedback is UE specific
 monitoring PDCCH addressed by RA-RNTI if the feedback is group based
If the drx-InactivityTimer is running, the UE monitors the PDCCH addressed by C-RNTI or temp C-RNTI for DL data.

Otherwise, the UE monitors:
 PDCCH addressed by P-RNTI (or a separate P-RNTI introduced for inactive state UEs) for MT data if the MT notification is supported or configured.
 PDCCH addressed by C-RNTI (or a temp C-RNTI) for MT data if the direct MT reception is supported or configured.
An example of what has been discussed above is now described with respect to FIG. 4.

FIG. 4 shows an exemplary subframe scheduling pattern 400, for example for UL and DL scheduling between a UE and a network node (such as a gNB).

In FIG. 4, a paging cycle or notification cycle is shown at 402. In this example the paging cycle is sixteen subframes, although of course in other embodiments other values may be provided. A paging message may be sent to the UE at the PO within each cycle. Thus, within paging cycle 402 there is a first paging occasion (PO#1) shown at 404. There is then a second paging occasion (PO#2) 406 within the second paging cycle, and so on. Therefore it may be considered that the paging occasions are determined by the paging cycle. In some embodiments, detection of a paging occasion triggers the UE to enter a DRX active state.

In this embodiment the UE makes a UL data transmission at subframe 408. This transmission is made according to the grant-free uplink transmission scheme. That is the UE does not have to wait for scheduling information to transmit at subframe 408. A window, a time offset or timeframe for monitoring for feedback for the UL transmission is shown at 410. In this embodiment there is a time offset configured between the UL transmission 408 and the start of window 410. In this embodiment the time offset is two subframes, although in other embodiments other values may be configured. The window starts at subframe 411. In this example the window is eight subframes long. Of course, in other embodiments the window may be of a different length. In some embodiments it may be considered that the response window comprises a time frame during which a downlink message is expected in response to an uplink message sent by the user equipment according to the grant-free uplink transmission scheme. In the example of FIG. 4 DL feedback (i.e. in response to UL transmission at 408) is received at the UE at subframe 412. This feedback may be in the form of an ACK message rather than comprising the data payload itself. In this example the data payload is received at subframe 414, scheduled by the DL PDCCH. In other embodiments the data payload may be sent straight to the UE, without a preceding ACK (MT data).

In response to receiving the DL feedback at subframe 412, the DRX inactivity timer is started at subframe 413. Therefore the UE may be considered to start the inactivity timer in response to receipt of DL feedback and/or DL data. In other words the UE determines that it has received the DL feedback it was expecting for the UL data sent previously and can thus consider entering a DRX active state. In some embodiments the inactivity timer is started in a subframe immediately following a subframe in which the DL feedback and/or data is received. In other embodiments there may be configured a time offset between receiving the DL feedback and/or data and starting the inactivity timer. During the inactivity timer period the UE is checking for DL PDCCH, and if it doesn't receive any then it determines that it can enter a sleep state. The inactivity timer may be configured to last for a certain number of subframes. For example the duration of the inactivity timer may be five subframes. In this embodiment the DRX inactivity timer is restarted at subframe 415, in response to receiving the DL data at subframe 414. In other words the user equipment is configured to restart the timer in response to determining that there is a message intended for the user equipment. As mentioned briefly above, the UE may in at least some embodiments support HARQ. The UE may be configured to restart the timer in response to receiving a HARQ retransmission. Therefore to some extent the timer may be considered a DRX inactivity timer or a DRX retransmission timer. No further DL data is received after subframe 415, and therefore the DRX inactivity timer expires at subframe 416. Upon expiration of the timer the UE can enter a sleep state. Therefore in some embodiments the sleep state is entered in a same subframe as the timer expires. In some embodiments the UE enters the sleep state in a subframe following expiration of the timer. In some embodiments the UE enters the sleep state in a subframe immediately following expiration of the timer. The "sleep" state is a lower activity (or lower energy consumption) state than the "low activity" or "inactive" state during which the UE is in DRX active state. The sleep state may be considered a DRX sleep or DRX idle state.

In at least some embodiments the feedback for UL grant free transmission is group based. In at least some embodiments the MT data is notified by paging message. Thus, according to such embodiments (and in conformance with FIG. 4) the UE may perform the following:

UE monitors P-RNTI at PO #1 (i.e. subframe 404)
UE keep DRX active within a window from SF #n (i.e. subframe 408) to SF #k (i.e. subframe 412) for RA-RNTI.
UE monitors RA-RNTI and C-RNTI at PO #2 (i.e. subframe 406).
UE starts drx-InactivityTimer and monitors C-RNTI from SF #k+1 (i.e. subframe 413).
UE restarts drx-InactivityTimer and monitors C-RNTI from SF #i+1 (i.e. subframe 415).
UE is in DRX sleep state starting from SF #j (i.e. subframe 416) after drx-InactivityTimer expires.

Figure 5:
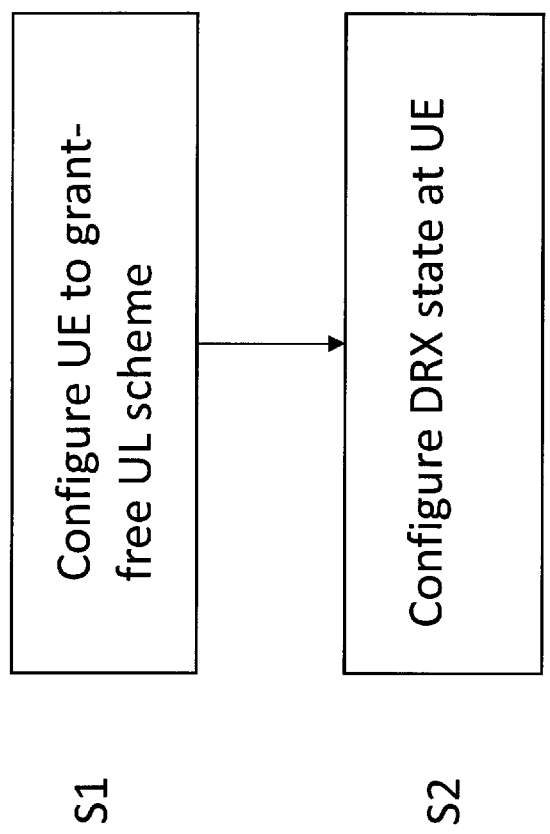
FIG. 5 is a flowchart of a method according to an embodiment.

FIG. 5 is a flow chart showing method steps according to an embodiment of the present invention.

At step S1 a user equipment in a low activity state is configured to operate according to a grant-free uplink transmission scheme. According to embodiments there may of course also be an earlier step (not shown) of the UE's state being transitioned from an active state to the low activity state. In some embodiments this earlier step is in response to a communication from a network node, such as a RAN node.

At step S2, and in response to detecting at least one condition, the method comprises scheduling a discontinuous reception state at the user equipment, during which the user equipment is configured to monitor for one or more messages intended for the user equipment.

In the embodiments described the UE communicates with one or more network nodes, for example base stations or other RAN nodes. For example the UE sends the UL information to and receives the DL information from (or via) the base stations. These base stations may act as a relay for sending information to and receiving information from the CN. As mentioned above, in the parlance of 5G these base stations may be referred to as gNBs or next generation Node Bs. The method steps described above (and with respect to FIG. 5) may take place at the user equipment, at a network node, or distributed therebetween. For example the configuring, detecting and scheduling steps may take place at the user equipment, at a network node, or distributed therebetween.

Appropriate means can be provided for implementing the above described functions. The means can be software and/or hardware based, and are not limited by the examples given in this specification.

The required data processing apparatus and functions may be provided by means of one or more data processors. The described functions may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples. The data processing may be distributed across several data processing modules. A data processor may be provided by means of, for example, at least one chip. Appropriate memory capacity can be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

An appropriately adapted computer program code product or products may be used for implementing the embodiments, when loaded or otherwise provided on an appropriate data processing apparatus, for example for causing use of specific security credential and/or updates thereof, control operation of the devices and communication of information between the various devices. The program code product for providing the operation may be stored on, provided and embodied by means of an appropriate carrier medium. An appropriate computer program can be embodied on a computer readable record medium. A possibility is to download the program code product via a data network. In general, the various embodiments may be implemented in hardware or special purpose circuits, software, logic or any combination thereof. Embodiments of the inventions may thus be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

It is noted that whilst certain embodiments have been described above in relation to certain architectures, this disclosure is not limited by this. Therefore, although certain embodiments were described above by way of example with reference to certain exemplifying architectures for wireless networks, technologies and standards, embodiments may be applied to any other suitable forms of communication systems than those illustrated and described herein. It is also noted that different combinations of different embodiments are possible. It is also noted herein that while the above describes exemplifying embodiments of the invention, there are several variations and modifications which may be made to the disclosed solution without departing from the spirit and scope of the present invention.

What is claimed is:
1. A method, comprising:
while in a low activity state, wherein a user equipment is reachable by a mobile terminating data notification, is configured to operate according to a grant-free uplink transmission scheme, and is able to receive acknowl- edgement in response to an uplink data transmission performed without a specific scheduling from the network, in response to detecting at least one condition, wherein the at least one condition is during a time window for receiving the acknowledgement for the uplink data transmission, entering a discontinuous reception active state for monitoring for one or more messages intended for the user equipment, wherein the monitoring for one or more messages comprises monitoring a physical downlink control channel, and the monitoring the physical downlink control channel comprises monitoring for a random access radio network temporary identifier (RA-RNTI) if the one or more messages is group based, or monitoring for a cell radio network temporary (C-RNTI) identifier if the one or more messages is user equipment specific.

2. The method according to claim 1, wherein the at least one condition comprises the response window, the response window comprising a time frame during which a downlink message is expected in response to an uplink message sent by the user equipment according to the grant-free uplink transmission scheme.

3. The method according to claim 1, wherein the timer comprises a discontinuous reception inactivity timer or a discontinuous reception retransmission timer.

4. The method according to claim 1, wherein the user equipment is configured to restart the timer in response to determining that there is a message intended for the user equipment.

5. The method as set forth in claim 1, wherein the monitoring for one or more messages comprises monitoring for one or more of:
 a response to an uplink message sent by the user equipment according to the grant-free uplink transmission scheme;
 a mobile terminating data notification.

6. The method as set forth in claim 1, wherein the monitoring the physical downlink control channel further comprises monitoring for a paging radio network temporary identifier (P-RNTI) in order to check for the presence of a paging message.

7. The method as set forth claim 1, wherein the low activity state comprises an inactive or idle state.

8. The method as set forth in claim 1, wherein the user equipment is operating in a fifth generation or new radio network.

9. An apparatus, comprising:
 at least one processor; and
 at least one memory including computer program code, wherein the at least one memory and the computer program code are configured, with the at least one processor, to:
 while in a low activity state, wherein the apparatus is reachable by a mobile terminating data notification, is configured to operate according to a grant-free uplink transmission scheme, and is able to receive acknowledgement in response to an uplink data transmission performed without a specific scheduling from the network,
 in response to detecting at least one condition, wherein the at least one condition is during a time window for receiving the acknowledgement for the uplink data transmission,
 enter in a discontinuous reception active state for monitoring for one or more messages intended for the apparatus, wherein
 the monitoring for one or more messages comprises monitoring a physical downlink control channel, and
 the monitoring the physical downlink control channel comprises monitoring for a random access radio network temporary identifier (RA-RNTI) if the one or more messages is group based, or monitoring for a cell radio network temporary (C-RNTI) identifier if the one or more messages is user equipment specific.

10. The apparatus according to claim 9, wherein the at least one condition comprises the response window, the response window comprising a time frame during which a downlink message is expected in response to an uplink message sent by the apparatus according to the grant-free uplink transmission scheme.

11. The apparatus according to claim 9, wherein the timer comprises a discontinuous reception inactivity timer or a discontinuous reception retransmission timer.

12. The apparatus according to claim 9, wherein the apparatus is configured to restart the timer in response to determining that there is a message intended for the apparatus.

* * * * *